US010832657B2

(12) United States Patent
Suzuki et al.

(10) Patent No.: US 10,832,657 B2
(45) Date of Patent: Nov. 10, 2020

(54) USE OF SMALL UNIT LANGUAGE MODEL FOR TRAINING LARGE UNIT LANGUAGE MODELS

(71) Applicant: INTERNATIONAL BUSINESS MACHINES CORPORATION, Armonk, NY (US)

(72) Inventors: Masayuki Suzuki, Tokyo (JP); Nobuyasu Itoh, Kanagawa (JP); Gakuto Kurata, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 15/909,206

(22) Filed: Mar. 1, 2018

(65) Prior Publication Data

US 2019/0272318 A1 Sep. 5, 2019

(51) Int. Cl.
| | |
|---|---|
| *G10L 15/06* | (2013.01) |
| *B41B 27/08* | (2006.01) |
| *G10L 15/18* | (2013.01) |
| *G10L 15/183* | (2013.01) |
| *G10L 15/00* | (2013.01) |
| *G06F 40/284* | (2020.01) |
| *G06F 40/47* | (2020.01) |
| *G06F 40/49* | (2020.01) |
| *G06N 3/04* | (2006.01) |

(52) U.S. Cl.
CPC ............ *G10L 15/063* (2013.01); *B41B 27/08* (2013.01); *G06F 40/284* (2020.01); *G06F 40/47* (2020.01); *G06F 40/49* (2020.01); *G10L 15/005* (2013.01); *G10L 15/183* (2013.01); *G10L 15/1815* (2013.01); *G06N 3/0472* (2013.01)

(58) Field of Classification Search
CPC .............................. G10L 15/183; G06F 17/277
USPC ...................................................... 704/9, 257
See application file for complete search history.

(56) References Cited

U.S. PATENT DOCUMENTS

| | | | | |
|---|---|---|---|---|
| 6,021,384 | A * | 2/2000 | Gorin ..................... | G10L 15/197 704/1 |
| 8,812,299 | B1 * | 8/2014 | Su ........................ | G06F 17/2785 704/1 |

(Continued)

FOREIGN PATENT DOCUMENTS

EP 2950306 A1 2/2015

OTHER PUBLICATIONS

Iyer, Rukmini, Mari Ostendorf, and Herbert Gish. "Using out-of-domain data to improve in-domain language models." IEEE Signal processing letters 4.8 (1997): 221-223. (Year: 1997).*

(Continued)

*Primary Examiner* — Shaun Roberts
(74) *Attorney, Agent, or Firm* — Tutunjian & Bitetto, P.C.; Randall Bluestone

(57) ABSTRACT

A computer-implemented method, computer program product, and apparatus are provided. The method includes generating a plurality of sequences of small unit tokens from a first language model that is trained with a small unit corpus including the small unit tokens, the small unit corpus having been derived by tokenization with a small unit. The method further includes tokenizing the plurality of sequences of small unit tokens by a large unit that is larger than the small unit, to create a derived large unit corpus including derived large unit tokens.

19 Claims, 4 Drawing Sheets

(56) References Cited

U.S. PATENT DOCUMENTS

| | | | |
|---|---|---|---|
| 9,292,489 B1 | 3/2016 | Sak et al. | |
| 9,348,809 B1* | 5/2016 | Zhao | G06F 17/278 |
| 2006/0074656 A1* | 4/2006 | Mathias | G10L 15/063 |
| | | | 704/243 |
| 2011/0153324 A1* | 6/2011 | Ballinger | G10L 15/30 |
| | | | 704/235 |
| 2013/0006629 A1* | 1/2013 | Honda | G10L 15/187 |
| | | | 704/236 |
| 2014/0176603 A1* | 6/2014 | Kumar | G06T 11/60 |
| | | | 345/633 |
| 2015/0178265 A1* | 6/2015 | Anderson | G06F 16/951 |
| | | | 704/9 |
| 2015/0325235 A1* | 11/2015 | Levit | G10L 15/18 |
| | | | 704/257 |
| 2016/0365090 A1 | 12/2016 | Nissan | |
| 2017/0206890 A1* | 7/2017 | Tapuhi | G10L 15/063 |
| 2018/0277143 A1* | 9/2018 | Song | G10L 15/16 |

OTHER PUBLICATIONS

Mikolov, "Subword Language Modeling with Neural Networks", preprint (http://www.fit.vutbr.cz/imikolov/mnlm/char.pdf), 2011.

* cited by examiner

Vocabulary

USE OF SMALL UNIT LANGUAGE MODEL FOR TRAINING LARGE UNIT LANGUAGE MODELS

BACKGROUND

Technical Field

The present invention relates to improvement of large unit language models.

Description of the Related Art

In general, phrases include a plurality of words and are larger than a word. However, in some languages, a phrase may be used as a word unit in a language model due to difficulties of delineating words within text strings, in contrast to the general relationship. For example, Korean text strings include spaces between phrases, but not between words, and so a language model for Korean may use an entire phrase as word unit.

Issues such as this may cause data sparseness for a language model. In order to achieve satisfactory performance of speech recognition, machine translation, syntax analysis, etc., language models may need a large amount of corpus data, which may require enormous computational resources, such as processing power, memory, etc.

SUMMARY

According to an aspect of the present invention, a method is provided. The method includes generating a plurality of sequences of small unit tokens from a first language model that is trained with a small unit corpus including the small unit tokens, the small unit corpus having been derived by tokenization with a small unit. The method further includes tokenizing the plurality of sequences of small unit tokens by a large unit that is larger than the small unit, to create a derived large unit corpus including derived large unit tokens.

The forgoing aspect may also include an apparatus configured to perform the method, and a computer program product storing instructions embodied on a computer-readable medium or programmable circuitry, that, when executed by a processor or the programmable circuitry, cause the processor or the programmable circuitry to perform the method. The summary clause does not necessarily describe all features of the embodiments of the present invention. Embodiments of the present invention may also include sub-combinations of the features described above.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
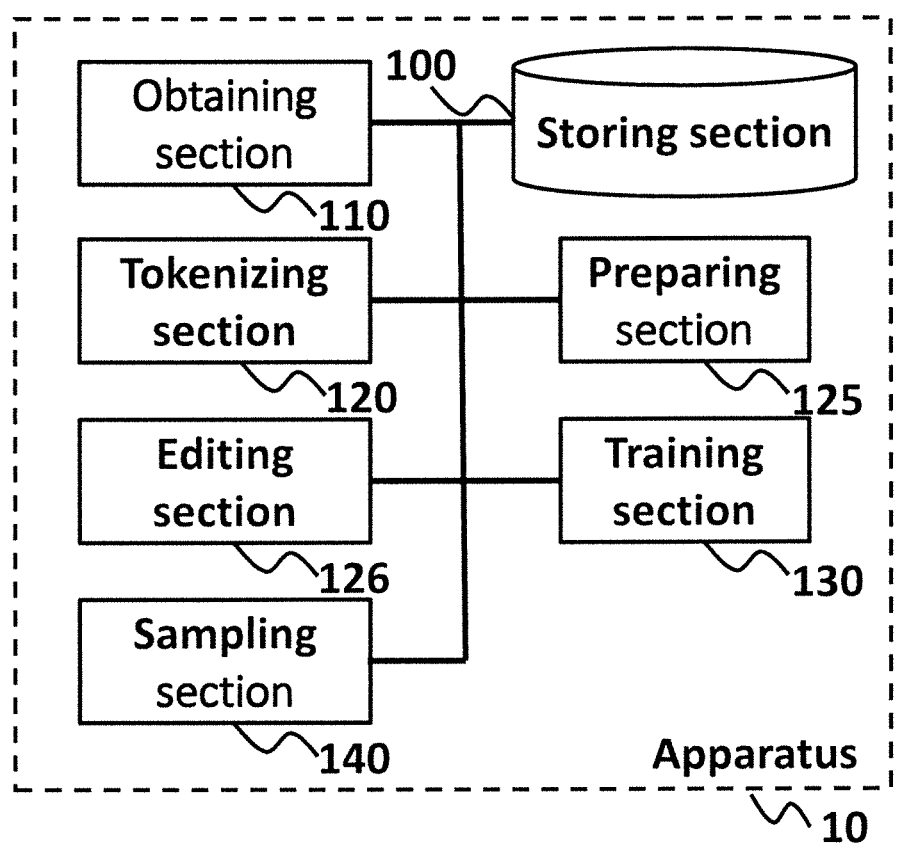
FIG. 1 shows an exemplary configuration of an apparatus, according to an embodiment of the present invention.

FIG. 1 shows an exemplary configuration of an apparatus 10, according to an embodiment of the present invention. The apparatus 10 may generate a large unit based language model that has improved data sparseness, by dividing large unit tokens (e.g., phrase) in a large unit corpus into small unit tokens (which may correspond to one or more characters or one or more words in natural language).

The apparatus 10 may include a processor and/or programmable circuitry. The apparatus 10 may further include one or more computer readable mediums collectively including instructions. The instructions may be embodied on the computer readable medium and/or the programmable circuitry. The instructions, when executed by the processor or the programmable circuitry, may cause the processor or the programmable circuitry to operate as a plurality of operating sections.

Thereby, the apparatus 10 may be regarded as including a storing section 100, an obtaining section 110, a tokenizing section 120, a preparing section 125, an editing section 126, a training section 130, and a sampling section 140.

The storing section 100 may store information used for the processing that the apparatus 10 performs. The storing section 100 may also store a variety of data/instructions used for operations of the apparatus 10. One or more other elements in the apparatus 10 (e.g., the obtaining section 110, the tokenizing section 120, the preparing section 125, the editing section 126, the training section 130, and the sampling section 140) may communicate data directly or via the storing section 100, as necessary.

The storing section 100 may be implemented by a volatile or non-volatile memory of the apparatus 10. In some embodiments, the storing section 100 may store a corpus, a vocabulary, a language model, and other data related thereto.

The obtaining section 110 may obtain a large unit corpus. The large unit corpus includes large unit tokens (e.g., Korean phrases) and may have been derived by tokenization of texts with the large unit (e.g., Korean phrase unit) In an embodiment, the tokenization is performed by dividing the texts at spaces. The obtaining section 110 may also obtain a native text corpus. The obtaining section 110 may obtain other data necessary for operations of the apparatus 10.

The obtaining section 110 may obtain the large unit corpus, the native text corpus and other data from database external to the apparatus 10. The obtaining section 110 may store the obtained corpus and other data to the storing section 100.

The tokenizing section 120 may tokenize a corpus having a specific size of unit tokens into another corpus having a different size of unit tokens. In an embodiment, the tokenizing section 120 may re-tokenize the large unit corpus with the small unit (e.g., a word in natural language) to re-create a small unit corpus including the small unit tokens (e.g., Korean words). The large unit is larger than the small unit. Thereby, the small unit corpus has been derived by re-tokenization of the large unit corpus with a small unit.

In an embodiment, the tokenizing section 120 may also tokenize a plurality of sequences of small unit tokens by a large unit. The plurality of sequences of small unit tokens may be provided by the sampling section 140 as explained later. In an embodiment, the tokenizing section 120 may join two or more small unit tokens to generate a derived large unit token. Thereby, the tokenizing section 120 may create a derived large unit corpus including derived large unit tokens.

The preparing section 125 may prepare an original vocabulary from the large unit corpus. In an embodiment, the preparing section 125 may include at least a part of the large unit tokens in the large unit corpus, into the original vocabulary.

The editing section 126 may edit the original vocabulary prepared by the preparing section 125. In an embodiment, the editing section 126 may add at least a part of the derived large unit tokens in the derived large unit corpus to the original vocabulary to create an edited vocabulary.

The training section 130 may train a language model with a corpus. The language model may enable estimation of the occurrence probability of a sequence of tokens (e.g., a text). The training section 130 may train a language model that inputs a sequence of one or more tokens and outputs an occurrence probability of a specific token subsequent to the sequence.

In an embodiment, the training section 130 may train a first language model with the small unit corpus. In an embodiment, the first language model may input one or more small unit tokens (e.g., Korean words) and output an occurrence probability of a specific small unit token subsequent to the one or more small unit tokens.

In an embodiment, the training section 130 may train a second language model with the derived large unit corpus by using the edited vocabulary. In an embodiment, the second language model may input one or more entries (e.g., Korean phrase or sequence of Korean words) each listed in the edited vocabulary, and output occurrence probability of a specific entry subsequent to the one or more entries.

In an embodiment, the training section 130 may train a third language model with the large unit corpus by using the edited vocabulary, and/or train a fourth language model with the native text corpus by using the edited vocabulary.

The training section 130 may generate an interpolated language model by interpolating the third language model, and at least one of the second language model and the fourth language model. In an embodiment, the training section 130 may interpolate (i) the third language model, and (ii) one or both of the second language model and the fourth language model, to create the interpolated language model.

The sampling section 140 may generate a plurality of sequences of small unit tokens from the first language model. In an embodiment, the sampling section 140 may perform stochastic sampling of a plurality of sequences of the small unit tokens according to the first language model.

Figure 2:
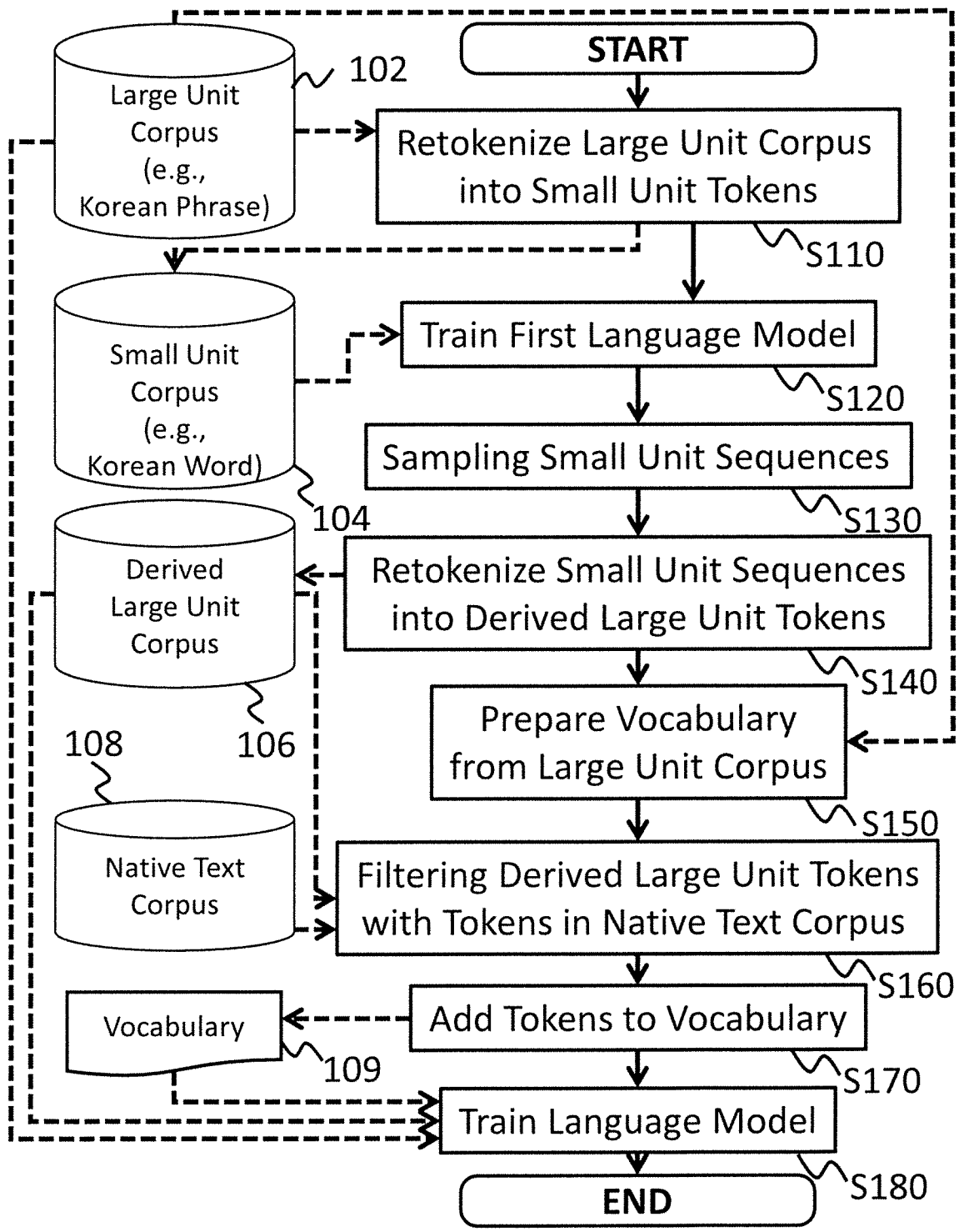
FIG. 2 shows an operational flow according to an embodiment of the present invention.

FIG. 2 shows an operational flow according to an embodiment of the present invention. The present embodiment describes an example in which an apparatus, such as the apparatus 10, performs operations from S110 to S180, as shown in FIG. 2 to generate an improved large-unit-based language model.

At S110, a tokenizing section such as the tokenizing section 120 may re-tokenize a large unit corpus 102 that has been derived by tokenization with a large unit, into small unit tokens by a small unit. The large unit corpus 102 may be stored in a storing section such as the storing section 100. In an embodiment, the large unit corpus 102 may be an in-domain corpus, which may include text in one or more specific topics (e.g., Sports, Science, Daily News, etc.).

In an embodiment, the tokenizing section may tokenize an initial Korean corpus that includes phrases as the large unit tokens, into word tokens as the small unit tokens. In such embodiments, the large unit is a Korean phrase, and the small unit is a Korean word.

The tokenizing section may use any known tokenizer to tokenize the large unit tokens. In an embodiment, the tokenizing section may preliminarily train a tokenizer model such as SentencePiece Model® to make small unit tokens from a corpus (which may be at least a part of the large unit corpus 102 or other corpus). In an embodiment, a SentencePiece Model® may be trained to divide a large unit token into small unit tokens so as to minimize entropy.

In the embodiment, the tokenizing section may use the trained SentencePiece Model® to re-tokenize the large unit corpus 102 into the small unit tokens. Thereby the tokenizing section may re-create a small unit corpus 104 including the small unit tokens. In an embodiment, the tokenizing section may store the small unit corpus 104 in the storing section.

Figure 3:
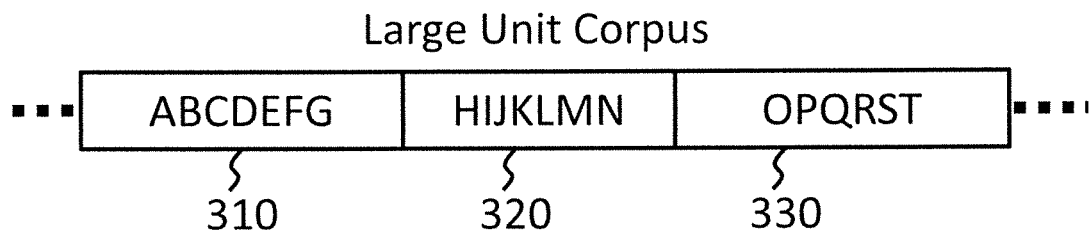
FIG. 3 shows a large unit corpus according to an embodiment of the present invention.

FIG. 3 shows a large unit corpus according to an embodiment of the present invention. In an embodiment of FIG. 3, the large unit corpus includes a large unit token 310 (shown as "ABCDEFG"), a large unit token 320 (shown as "HIJKLMN"), and a large unit token 330 (shown as "OPQRST"). In the large unit corpus, each large unit token may be treated as the word unit.

In FIG. 3, each letter, such as "A" and "B," may represent a character in a target language (e.g., Korean word). For example, the large unit token 310 may be a phrase including 7 characters represented by "A", "B", "C", "D", "E", "F", and "G." In some languages (e.g., Chinese), a single character alone may represent a word.

Figure 4:
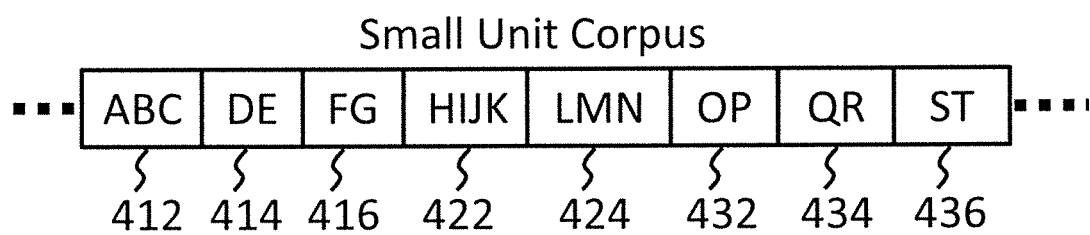
FIG. 4 shows a small unit corpus according to an embodiment of the present invention.

FIG. 4 shows a small unit corpus according to an embodiment of the present invention. In an embodiment of FIG. 4, the small unit corpus includes a small unit token 412 (shown as "ABC"), a small unit token 414 (shown as "DE"), a small unit token 416 (shown as "FG"), a small unit token 422 (shown as "HIJK"), a small unit token 424 (shown as "LMN"), a small unit token 432 (shown as "OP"), a small unit token 434 (shown as "OR"), and a small unit token 436 (shown as "ST").

In an embodiment, the tokenizing section may create the small unit corpus in FIG. 4 from the large unit corpus in FIG. 3. In the embodiment, the tokenizing section retokenizes the large unit token 310 "ABCDEFG" into the small unit token 412 "ABC", the small unit token 414 "DE", and the small unit token 416 "FG." Each small unit token may correspond to a word (e.g., Korean word) in the target language. In an embodiment, some small unit tokens may correspond to two or more sequential words. In the small unit corpus, each small unit token may be treated as a word unit.

At S120, a training section, such as the training section 130, may train a first language model by using the small unit corpus created at S110. In an embodiment, the training section may train a first language model that inputs one or more preceding small unit tokens in the small unit corpus 104 and outputs an occurrence probability that each small unit token will appear subsequent to the preceding one or more small unit tokens.

In an embodiment, the first language model may input one or more preceding small unit tokens and may output a small unit token that is most likely to appear subsequent to the preceding one or more small unit tokens. In an embodiment, the first language model may be a recurrent neural network. Thereby, the first language model may predict a sequence of small unit tokens that has not appeared in the original large unit corpus.

At S130, a sampling section, such as the sampling section 140, may sample a plurality of sequences of the small unit tokens. In an embodiment, the sampling section may generate a plurality of sequences of small unit tokens from the first language model trained at S120.

At S130, the sampling section may create a plurality of sentences as the plurality of sequences of the small unit tokens. For example, for generating each sentence, the sampling section may stochastically determine a first small unit token among all small unit tokens by inputting <BoS> (which represents Beginning of Sentence) to the first language model. In the example, when a probability that a small unit token "ABC" appears subsequent to <BOS> is 5% according to the first language model, the sampling section may determine the small unit token "ABC" as the first small unit token with the probability of 5%. In another example, the sampling section may determine the most probable small unit token subsequent to <BoS> according to the first language model as the first small unit token.

Then the sampling section may stochastically determine a second small unit token among all small unit tokens by inputting <BoS> and the first small unit token to the first language model. In the example, when a probability that a small unit token "XY" appears subsequent to <BOS> and "ABC" is 3% according to the first language model, the sampling section may determine the small unit token "XY" as the second small unit token with the probability of 3%. In another example, the sampling section may determine the most probable small unit token subsequent to <BoS> and "ABC" according to the first language model as the second small unit token.

The sampling section may continue to determine further small unit tokens for a sentence until <EoS> (which represents End of Sentence) appears. In an embodiment, the sampling section may set an upper threshold and/or a lower threshold for a length (e.g., a number of the small unit tokens or characters) of the sequence of the small unit tokens, and generate the sequence of the small unit tokens having the length within the upper threshold and/or the lower threshold. In the embodiment, when the sampling section detects that a length of a sequence of the small unit tokens exceeds the upper threshold, the sampling section may add <EoS> to the sequence or replace the last small unit token with <EoS> in the sequence.

In another embodiment, the first language model has <EoS> as one of the small unit tokens, and <EoS> stochastically appears depending on preceding small unit tokens in the first language model. In an embodiment, when the sampling section detects that a length of a sequence of the small unit tokens falls below the lower threshold of the length, the sampling section may select a next small unit token among the small unit tokens except <EoS>.

Figure 5:
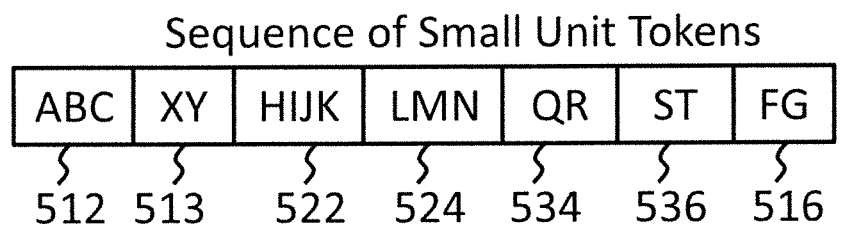
FIG. 5 shows a sequence of small unit tokens according to an embodiment of the present invention.

FIG. 5 shows a sequence of small unit tokens according to an embodiment of the present invention. In the embodiment of FIG. 5, the sequence of small unit tokens includes a small unit token 512 (shown as "ABC"), a small unit token 513 (shown as "XY"), a small unit token 522 (shown as "HIJK"), a small unit token 524 (shown as "LMN"), a small unit token 534 (shown as "QR"), a small unit token 536 (shown as "ST"), and a small unit token 516 (shown as "FG") in this order. The sequence in FIG. 5 may include <BoS> before the small unit token 512 and <EoS> after the small unit token 516.

The sampling section may generate the sequence in FIG. 5 from the first language model that is created from the small unit corpus in FIG. 4. The sequence in FIG. 5 may be regarded as an artificial sentence "ABCXYHIJKLMN-QRSTFG", which may be unnatural to a native human speaker of the target language.

At S140, the tokenizing section may tokenize the plurality of sequences of small unit tokens by a large unit to create a derived large unit corpus 106 including derived large unit tokens. In an embodiment, the tokenizing section may store the derived large unit corpus 106 in the storing section.

Each derived large unit token includes one or more sequential small unit tokens. In an embodiment, the tokenizing section may tokenize the sequence of small unit tokens with the large unit, by joining two or more sequential small unit tokens in the sequence of small unit tokens to generate a derived large unit token. In an embodiment, the tokenizing section may join two or more sequential small unit tokens based on a predetermined rule. In the embodiment, the tokenizing section may join a randomly determined or predetermined number of two or more sequential small unit tokens in the sequence to generate each derived large unit token.

In an embodiment, the tokenizing section may tokenize a single small unit token as a large unit token without joining the small unit tokens. In other words, some small unit tokens may be treated as a large unit token as they are in subsequent operations.

Figure 6:
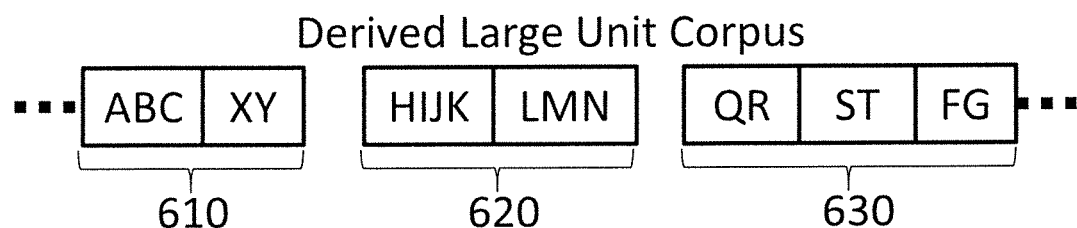
FIG. 6 shows a derived large unit corpus according to an embodiment of the present invention.

FIG. 6 shows a derived large unit corpus according to an embodiment of the present invention. In an embodiment of FIG. 6, the derived large unit corpus includes a derived large unit token 610 (shown as "ABCXY"), a derived large unit token 620 (shown as "HIJKLMN"), and a derived large unit token 630 (shown as "QRSTFG").

In an embodiment, the derived large unit tokens 610, 620, and 630 in FIG. 6 are derived from tokenization of the sequence of small unit tokens in FIG. 5. In the embodiment, the tokenizing section may concatenate the small unit tokens 512 and 513 to create the derived large unit token 610, concatenate the small unit tokens 522 and 524 to create the derived large unit token 620, and concatenate the small unit tokens 534, 536 and 516 to create the derived large unit token 630.

In an embodiment, the tokenizing section may tokenize each sequence of the small unit tokens in different two or more manners. For example, in addition to the tokenization shown in FIG. 6, the tokenizing section may further tokenize the sequence of small unit tokens in FIG. 5 to create derived large unit tokens "ABCXYHIJK", "LMNQR", and "STFG." In an embodiment, the tokenizing section may tokenize each sequence of the small unit tokens in all or a part of possible manners.

In an alternative embodiment, the tokenizing section may perform the operation of S140 by utilizing at a large unit tokenizer (such as a conventional tokenizer using a large unit). For example, the tokenizing section may first joint all small unit tokens in each sentence by removing spaces within the sentence, and then tokenize the each sentence with the large unit tokenizer to obtain the derived large unit tokens. In the embodiment, the large unit tokenizer may be the same as or different from a tokenizer that has been used for preparing the large unit corpus 102.

At S150, a preparing section such as the preparing section 125 may prepare an original vocabulary 109 from a large unit corpus. In an embodiment, the preparing section may use at least a part of the large unit corpus 102 used at S110. In another embodiment, the preparing section may use a large unit corpus that is at least partially different from the large unit corpus 102 but at least partially belongs to the same or related domain as the large unit corpus 102.

In an embodiment, the preparing section may extract at least some of the large unit tokens in the large unit corpus and add the extracted large unit tokens as entries of the vocabulary 109. In an embodiment, the preparing section may add other tokens to the vocabulary 109.

At S160, an editing section, such as the editing section 126, may perform filtering of the derived large unit tokens obtained at S140, with large unit tokens in a native text corpus 108.

In an embodiment, the editing section may select derived large unit tokens that appear in the native text corpus 108, from among the derived large unit tokens in the derived large unit corpus 106. The native text corpus 108 may include large unit tokens (e.g., Korean phrase) that are tokenized by the large unit.

In an embodiment, the native text corpus 108 may be larger than the large unit corpus 102 in terms of data amount and/or the number of sentences. In an embodiment, the native text corpus 108 may be out-of-domain. In an embodiment, the native text corpus may be a web corpus that may be accessed on the internet.

In a specific embodiment, the editing section may select derived large unit tokens that appear in the native text corpus 108 more than a predetermined frequency or amount, from among the derived large unit tokens in the derived large unit corpus 106. Thereby, the editing section may not select the derived large unit tokens that are not used in natural language and unnatural to the native speaker.

At S170, the editing section may add the derived large unit tokens selected at S160 to the original vocabulary to create the edited vocabulary. In an embodiment, the editing section may add the selected derived large unit tokens to the vocabulary 109.

Figure 7:
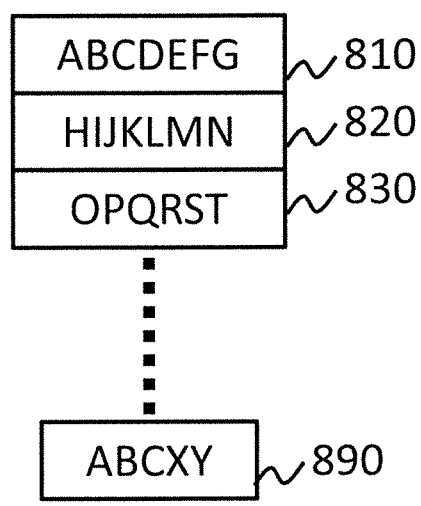
FIG. 7 shows a vocabulary according to an embodiment of the present invention.

FIG. 7 shows a vocabulary according to an embodiment of the present invention. The vocabulary may include tokens (which may be phrases and/or words) derived from corpus. In an embodiment of FIG. 7, the vocabulary includes a large unit token 810 (shown as "ABCDEFG"), a large unit token 820 (shown as "HIJKLMN"), a large unit token 830 (shown as "OPQRST"), . . . , and a large unit token 890 (shown as "ABCXY"). In the embodiment, the large unit tokens 810-830 may be included in the original vocabulary at S150, and correspond to the large unit tokens 310-330 in FIG. 3.

In the embodiment, the large unit token 890 may be a derived large unit token selected at S160, and may not be included in the original vocabulary. In an embodiment, the editing section may add the large unit token 890 as a derived large unit token at S170. Thereby the vocabulary includes new tokens in addition to the originally included tokens.

In an embodiment, the editing section may add the derived large unit tokens that have not been selected at S160 to be outside-of-vocabulary (OoV). In the embodiment of FIGS. 6-7, the derived large unit token 630 "QRSTFG" is not selected (which may mean that the token is unnatural), and the large unit token 630 may be included in OoV.

At S180, the training section may train one or more language models from at least one of the large unit corpus 102, the derived large unit corpus 106, and the native text corpus 108 using at least the vocabulary 109 edited at S170.

In an embodiment, the training section may train a second language model by using the derived large unit corpus 106 and the edited vocabulary 109. The second language model may input one or more entries (each of which may be a large unit token such as Korean phrase or a derived large unit token) listed in the edited vocabulary 109, and output an occurrence probability of a specific entry subsequent to the one or more sequential entries, in the derived large unit corpus 106. In an embodiment, the training section may train the second language model by using the original vocabulary 109 that is not edited by the editing section instead of the edited vocabulary 109.

In an embodiment, the training section may train a third language model by using the large unit corpus 102 and the edited vocabulary 109. The third language model may input one or more sequential entries each listed in the edited vocabulary 109, and output an occurrence probability of a specific entry subsequent to the one or more sequential entries in the large unit corpus 102.

In an embodiment, the training section may train a fourth language model by using the native text corpus 108 and the edited vocabulary 109. The fourth language model may input one or more sequential entries each listed in the edited vocabulary 109, and output an occurrence probability of a specific entry subsequent to the one or more sequential entries in the native text corpus 108.

The second language model, third language model, and fourth language models may each be an n-gram language model, which may be more suitable for the first pass decoding than neural network language models. Thereby, the training section may train these language models with less computational resources and/or time. In other embodiments, the second language model, third language model, and fourth language models may each be a recurrent neural network or any other type of neural network.

In an embodiment, the apparatus may not train the second and fourth language models, using only the third language model as a resultant language model. In an embodiment, the apparatus may not train the third and fourth language models, using only the second language model as a resultant language model.

In an embodiment, the training section may further train the second and/or fourth language models in addition to the third language model. In such embodiments, the training section may interpolate (i) the third language model, and (ii) one or both of the second language model and the fourth language model, to create the interpolated language model as a resultant language model. Alternatively, the training section may interpolate (i) the second language model, and (ii) one or both of the third language model and the fourth language model, to create the interpolated language model as a resultant language model. The training section may perform the interpolation by estimating a weighted sum of two or more of language models.

As explained above, the apparatus may generate a large-unit-based language model based on a vocabulary that may have improved sparseness due to the derived additional large unit tokens. Thereby, the apparatus may improve the language model with less computational resources. In addition, the large-unit-based language model may enable liaison between small unit tokens, and to utilize existing large-unit-based software and data.

In some of the embodiments above, the large unit corpus 102 may be an in-domain corpus, while the native text corpus 108 may be an out-of-domain corpus. In these embodiments, the apparatus may improve in-domain language models using large unit tokens in the out-of-domain corpus.

In the embodiments explained above, Korean is used as an example of a target language. The apparatus may process other languages having words consisting of morphemes (e.g., Korean, German, etc.) and/or languages having many conjugations (e.g., Russian, Turkish, etc.).

Figure 8:
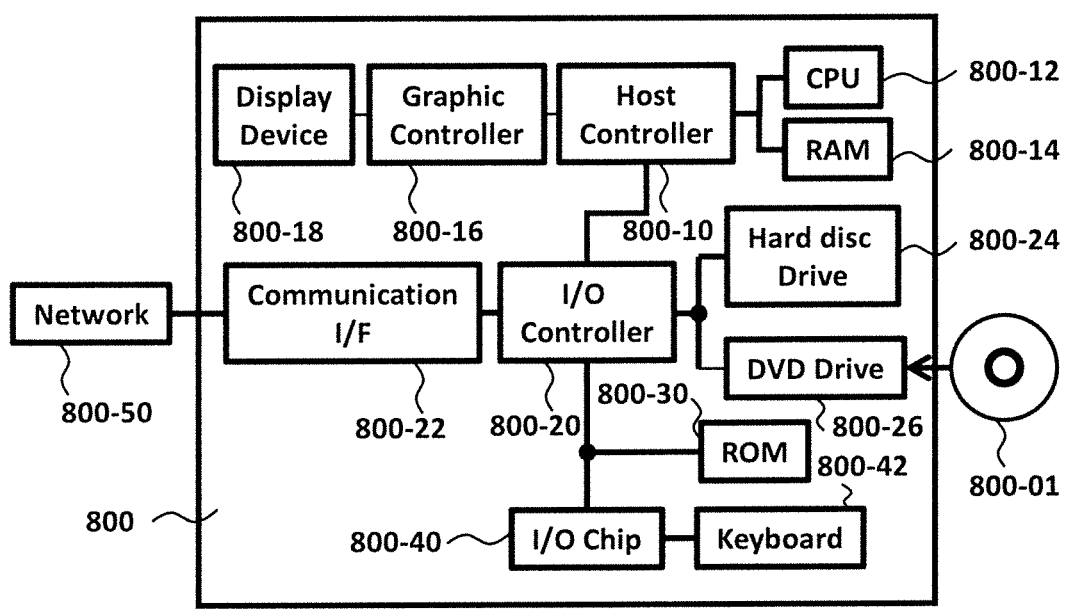
FIG. 8 shows an exemplary hardware configuration of a computer that functions as a system, according to an embodiment of the present invention.

FIG. 8 shows an exemplary hardware configuration of a computer configured for implementing the apparatus 10 and/or performing the operations explained in relation to FIGS. 1-7, according to an embodiment of the present invention.

A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein. Speech recognition based on the large token units and a large-unit-based language model improves the performance of the computer 800 by reducing the number of clock cycles used to process a word to be recognized. This improvement of the computer 800 can be seen as a faster response to the speech recognition command.

The computer 800 according to the present embodiment includes a CPU 800-12, a RAM 800-14, a graphics controller 800-16, and a display device 800-18, which are mutually connected by a host controller 800-10.

The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14.

In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention. The apparatus of the embodiments of the present invention may include the computer readable medium and the processor or programmable circuitry operable to execute the instructions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable improvements to a large unit language model.

What is claimed is:

1. A computer program product including one or more computer readable storage mediums collectively storing program instructions that are executable by a processor or programmable circuitry to cause the processor or programmable circuitry to perform operations comprising:
generating a plurality of sequences of small unit tokens from a first language model that is trained with a small unit corpus including the small unit tokens, the small unit corpus having been derived by tokenization with a small unit;
tokenizing the plurality of sequences of small unit tokens by a large unit that is larger than the small unit, to create a derived large unit corpus including derived large unit tokens, the large unit corpus being an in-domain corpus;
re-tokenizing the derived large unit corpus by the small unit to re-create the small unit corpus including the small unit tokens, the large unit corpus including the derived large unit tokens and having been derived by tokenization with the large unit; and
dynamically training a plurality of word language models using combined word sequences associated with an out-of-domain native text corpus and the in-domain corpus, the large unit tokens being utilized in the out-of-domain corpus during the training and being derived by joining a randomly determined number of sequential small unit tokens in the plurality of sequences of small unit tokens, the plurality of word language models trained using the small unit corpus and the large unit corpus being interpolated to generate an interpolated language model.

2. The computer program product of claim 1, wherein the operations further comprise:
training the first language model with the small unit corpus.

3. The computer program product of claim 2, wherein the first language model is a recurrent neural network.

4. The computer program product of claim 1, wherein the operations further comprise:
training a second language model with the derived large unit corpus.

5. The computer program product of claim 4, wherein the second language model is an n-gram language model.

6. The computer program product of claim 4, wherein the operations further comprise:
preparing an original vocabulary from the large unit corpus; and
adding at least a part of the derived large unit tokens in the derived large unit corpus to the original vocabulary to create an edited vocabulary.

7. The computer program product of claim 6, wherein the adding at least a part of the derived large unit tokens in the derived large unit corpus, includes:
selecting derived large unit tokens that appear in a native text corpus, from among the derived large unit tokens in the derived large unit corpus; and
adding the selected derived large unit tokens to the original vocabulary to create the edited vocabulary.

8. The computer program product of claim 7, wherein the selecting derived large unit tokens that appear in a native text corpus, from among the derived large unit tokens in the derived large unit corpus, includes:
selecting derived large unit tokens that appear in a native text corpus more than a predetermined frequency or amount, from among the derived large unit tokens in the derived large unit corpus.

9. The computer program product of claim 8, wherein the operations further comprise:
training a third language model with the large unit corpus by using the edited vocabulary; and
interpolating the second language model and the third language model to create an interpolated language model.

10. The computer program product of claim 8, wherein the operations further comprise:
training a third language model with the large unit corpus by using the edited vocabulary;
training a fourth language model with the native text corpus by using the edited vocabulary; and
interpolating the second language model, the third language model, and the fourth language model to create an interpolated language model.

11. A computer-implemented method, comprising:
generating a plurality of sequences of small unit tokens from a first language model that is trained with a small unit corpus including the small unit tokens, the small unit corpus having been derived by tokenization with a small unit;
tokenizing the plurality of sequences of small unit tokens by a large unit that is larger than the small unit, to create a derived large unit corpus including derived large unit tokens, the large unit corpus being an in-domain corpus;
re-tokenizing the derived large unit corpus by the small unit to re-create the small unit corpus including the small unit tokens, the large unit corpus including the derived large unit tokens and having been derived by tokenization with the large unit; and
dynamically training a plurality of word language models using combined word sequences associated with an out-of-domain native text corpus and the in-domain corpus, the large unit tokens being utilized in the out-of-domain corpus during the training and being derived by joining a randomly determined number of sequential small unit tokens in the plurality of sequences of small unit tokens, the plurality of word language models trained using the small unit corpus and the large unit corpus being interpolated to generate an interpolated language model.

12. The computer-implemented method of claim 11, further comprising:
training the first language model with the small unit corpus.

13. The computer-implemented method of claim 12, wherein the first language model is a recurrent neural network.

14. The computer-implemented method of claim 12, further comprising:
re-tokenizing a large unit corpus by the small unit to re-create the small unit corpus including the small unit tokens, the large unit corpus including the large unit tokens and having been derived by tokenization with the large unit.

15. The computer-implemented method of claim 14, further comprising:
training a second language model with the derived large unit corpus.

16. An apparatus comprising:
a processor or a programmable circuitry; and
one or more computer readable mediums collectively including instructions that, when executed by the processor or the programmable circuitry, cause the processor or the programmable circuitry to perform operations comprising:
generating a plurality of sequences of small unit tokens from a first language model that is trained with a small unit corpus including the small unit tokens, the small unit corpus having been derived by tokenization with a small unit;
tokenizing the plurality of sequences of small unit tokens by a large unit that is larger than the small unit, to create a derived large unit corpus including derived large unit tokens, the large unit corpus being an in-domain corpus;
re-tokenizing the derived large unit corpus by the small unit to re-create the small unit corpus including the small unit tokens, the large unit corpus including the derived large unit tokens and having been derived by tokenization with the large unit; and
dynamically training a plurality of word language models using combined word sequences associated with an out-of-domain native text corpus and the in-domain corpus, the large unit tokens being utilized in the out-of-domain corpus during the training and being derived by joining a randomly determined number of sequential small unit tokens in the plurality of sequences of small unit tokens, the plurality of word language models trained using the small unit corpus and the large unit corpus being interpolated to generate an interpolated language model.

17. The apparatus of claim 16, wherein the operations further comprise:
training the first language model with the small unit corpus.

18. The apparatus of claim 17, wherein the first language model is a recurrent neural network.

19. The apparatus of claim 17, wherein the operations further comprise:
re-tokenizing a large unit corpus by the small unit to re-create the small unit corpus including the small unit tokens, the large unit corpus including the large unit tokens and having been derived by tokenization with the large unit.

* * * * *